J. A. STRUTHERS.
GEARING FOR STARTING MECHANISM.
APPLICATION FILED MAY 14, 1913.
1,172,845.
Patented Feb. 22, 1916.
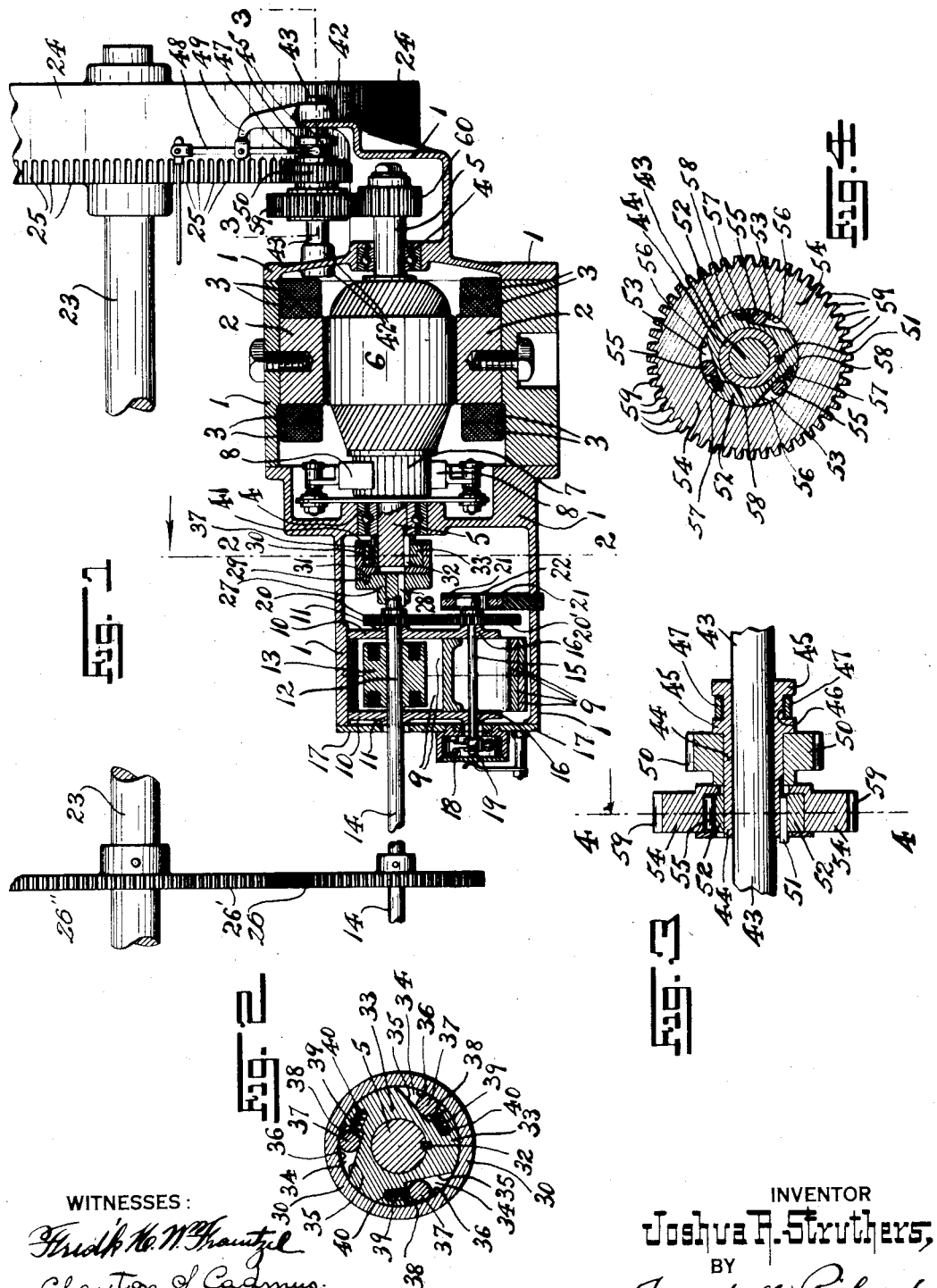
INVENTOR
Joshua A. Struthers,
BY
Fraentzel & Richards,
ATTORNEYS

UNITED STATES PATENT OFFICE.

JOSHUA A. STRUTHERS, OF JERSEY CITY, NEW JERSEY, ASSIGNOR TO THE TRI-UNIT ELECTRICAL CO., A CORPORATION OF NEW JERSEY.

GEARING FOR STARTING MECHANISM.

1,172,845. Specification of Letters Patent. Patented Feb. 22, 1916.

Application filed May 14, 1913. Serial No. 767,508.

*To all whom it may concern:*

Be it known that I, JOSHUA A. STRUTHERS, a citizen of the United States, residing at Jersey City, in the county of Hudson and State of New Jersey, have invented certain new and useful Improvements in Gearing for Starting Mechanism; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in electric starting, ignition and lighting apparatus for use in connection with auto vehicles and their internal combustion motors; and the invention relates, more particularly, to a novel construction and arrangement of a dynamo electric machine which operates either as a motor or a generator and a magneto electric machine, together with a novel transmission means for operatively relating the same with an internal combustion engine.

The present invention has for its principal object to provide a simple, compact and efficient dynamo electric machine which operates either as a motor or a generator and a magneto electric machine together with a novel transmission mechanism whereby the said devices may be related in proper association with an internal combustion engine so that they will perform their several functions in a proper manner, and in a proper time relation to the operating conditions demanded.

A further object of the present invention is to provide devices and transmission mechanism of the kind above mentioned which is so arranged as to take up a minimum amount of space in the hood of an auto vehicle where the engine and such additional mechanism is located, and the same, while being compactly arranged and mounted, performing its several functions according to the demands of the internal combustion engine without necessity of adjustment or special manipulation.

Other objects of the present invention not at this time more particularly enumerated will be clearly understood from the following detailed description of the same.

With the various objects of this invention in view, the same consists, primarily, in the novel arrangement and combination of a dynamo electric machine which operates either as a motor or a generator and a magneto electric machine and transmission mechanism interconnecting the same with each other and with an internal combustion engine as hereinafter set forth; and, furthermore, this invention consists in the novel arrangements and combinations of the various mechanisms and their parts, as well as in the details of the construction thereof, all of which will be hereinafter more fully described in the following specification, and then finally embodied in the clauses of the claims which are appended to and which form an essential part of this specification.

The invention is clearly illustrated in the accompanying drawings, in which:—

Figure 1 is a longitudinal section of a combined dynamo electric machine and magneto electric machine with interconnecting transmission mechanism and transmission mechanism for operatively relating the same to the crank-shaft of an internal combustion engine according to the principles of my present invention. Fig. 2 is a detail transverse section taken on line 2—2 in said Fig. 1, the same illustrating a novel association of clutch coupling between the armature shafts of said dynamo electric machine and said magneto-electric machine, the same being drawn on an enlarged scale. Fig. 3 is a detail horizontal section taken on line 3—3 in said Fig. 1, and illustrating a detachable transmission mechanism mounted between said dynamo electric machine armature shaft and the fly-wheel on the crank-shaft of an internal combustion engine, the same being drawn on an enlarged scale. Fig. 4 is a detail transverse section taken on line 4—4 in said Fig. 3.

Similar characters of reference are employed in all of the hereinabove described views to indicate corresponding parts.

Referring now to the said drawings, the reference character 1 indicates a frame-work or housing, connected with which are the field cores 2 of a dynamo electric machine, the same being provided with suitable field windings 3. Said housing or frame-work 1 is provided with suitably disposed bearing-portions 4 in which is journaled the armature-shaft 5 upon which is mounted the armature 6 of said dynamo electric machine. The said armature 6 is provided with the usual commutator 7, which receives the contact of the commutator brushes 8. Mounted in the forward end of said frame-work or housing 1 are the magnetic field pieces 9 of a magneto electric machine, the same being provided with side-plates 10. Suitably located in said side-plates 10 are bearing-portions 11 in which is journaled a magneto armature shaft 12 upon which is mounted a magneto armature 13 which rotates between the poles of said magnetic field pieces 9. Said armature shaft 12 may be formed by an extension of the pump shaft 14 of the internal combustion engine, or the same may be connected in a fixed coupled relation to said pump-shaft 14. The reference character 15 indicates a counter-shaft which is journaled in suitable bearing-portions 16 located in said side-plates 10. Mounted in a suitable manner upon the end-plate 17 of said frame-work or housing 1 is the casing of a make and break mechanism 18 for controlling the ignition current generated by the said magneto-electric machine. A cam-member 19 mounted on said counter-shaft 15 operates said make and break mechanism when said counter-shaft 15 is rotated by the intermeshing transmission gears 20 and 20′ fixed respectively upon said armature shaft 12 and said counter-shaft 15. Suitably connected and supported by said housing or frame-work 1 is a distributer mechanism provided with the usual contact pieces 21 which receive successively the contact of a brush-member 22 which is also mounted on and rotated by said counter-shaft 15 whereby the ignition current is properly delivered to the spark terminals or plugs of the internal combustion engine.

The reference character 23 indicates the crank-shaft of an internal combustion engine, the same being provided with the fly-wheel 24 in the perimeter of which are cut gear-teeth 25, the purpose of which will be subsequently explained. Said pump-shaft 14 is driven by the gear 26 and idler gear 26′ connecting the same with the gear 26″ on said crank-shaft 23, so that the said pump-shaft is rotated in a fixed time relation to the revolution of said crank-shaft 23 and the movement of the pistons of said internal combustion engine. The said armature-shaft 5 of the dynamo electric machine and the said armature-shaft 12 of the said magneto electric machine are mounted end to end with their axes in alinement. The adjoining ends of said respective shafts 5 and 12 are coupled together by means of a clutch-coupling in such a manner that the former may be driven by the latter as rotated by the pump-shaft 14, when said dynamo electric machine operates as a generator, but the clutch-coupling being so constructed as to permit the said dynamo electric machine armature-shaft 5 to travel ahead or rotate at a faster speed than the magneto-electric machine armature-shaft 12 and said pump-shaft when the dynamo electric machine is operating as a motor. This clutch-coupling comprises a disk 27 which is provided with a centrally disposed opening for the reception of the end of said armature-shaft 12 to which said disk 27 is fixed by means of a key 28, or any other suitable fastening device. The face of said disk 27 is provided with receiving sockets or openings 29. The reference character 30 indicates the female member of said clutch-coupling. Said female member 30 is provided on one end face with outwardly projecting studs 31 which are adapted to be inserted in said receiving sockets or openings 29 of said disk 27 whereby the latter is connected with said female-member in driving relation thereto. Secured upon the adjacent end of said dynamo electric machine shaft 5 by means of a key 32, or any other suitable fastening means, is the male-member 33 of said clutch-coupling. Said male-member 33 is provided upon its circumferential surface with a plurality of cut-away portions 34. Said male-member 33 is adapted to be inserted within said female-member 30, and when so arranged one of the walls 35 of each cutaway portion 34 is disposed at an acute angle to the inner annular surface 36 of said female-member 30. Arranged in each cutaway-portion 34 is a cylindrical-roller 37, the same being slightly smaller in diameter than the width of the space of said cutaway-portion between the inner end of its wall 35 and the inner annular surface 36 of said female member. Located in the walls 38 of said cutaway-portions 34 are sockets 39 in which are located compressed spiral springs 40 which project against one side of said cylindrical rollers 37 so as to normally press the same into operative contact with both the annular surface 36 of said female-member and each wall 35 of said cutaway portions. A keeper-ring or plate 41 is secured to the edge of said female-member so that the same overlaps the ends of said cylindrical rollers 37 to prevent their accidental displacement from their above described operative position. Mounted in suitable supports 42 connected with said frame-work or housing 1 is a shaft 43. Rotatably mounted on said shaft 43 is a sleeve 44 which is provided at one end with a pair of flanges 45 said flanges being spaced apart so as to provide an annular groove 46 adapted to receive the forked or straddling end 47 of a shift-lever 48. Said shift-lever 48 is fulcrumed in a bracket-member 49 connected in any suitable manner with a portion of said framework or housing 1, and serves to move said sleeve 44 longitudinally upon said shaft 43. Fixed upon said sleeve 44 is a spur-gear 50. Secured upon said sleeve 44, by means of a key 51, or any other suitable fastening means, is the male-member 52 of a clutch-coupling, the same being provided with cutaway portions 53 in its circumferential surface. Said male-member of said clutch-coupling is received within the female-member 54 of said clutch-coupling, and cylindrical-rollers, 55 are arranged in said cutaway portions 53 so as to engage the inner surface 56 of said female-member 54, the spring-sockets 57 and springs 58 being provided in said male-member 52 to maintain said cylindrical rollers in operative engagement with said male and female members of said clutch-coupling. Said female-member 54 is provided upon its outer cylindrical or circumferential surface with gear-teeth 59, which are adapted, when properly positioned to mesh with a spur-gear 60 fixed upon said dynamo electric machine armature shaft 5.

The purpose and operations of the above-described arrangement and combination of mechanism are as follows:—The arrangement of coupled dynamo electric machine and magneto electric machine, together with their above described association and mechanical connection with the crank-shaft of an internal combustion engine is for the purpose of providing a compact, simple, and effective means for electric starting or cranking of the internal combustion engine, electric ignition, and the generation of electric current for lighting. To this end the dynamo electric machine is electrically connected in any of the usual ways with storage-batteries, and the magneto electric machine and its make and break and distributer devices is connected with the spark-plugs or terminals located in the cylinders of the internal combustion engine. When the internal combustion engine is running under its own power, its crank-shaft transmits rotary movement, in a properly timed relation, to the pump-shaft 14, which is geared thereto, and the latter being either a part of the magneto-electric machine armature shaft 12, or in fixed coupled relation thereto, said armature on the magneto armature shaft is rotated to generate a magneto ignition current, which is delivered to the spark-plugs or terminals. The clutch-coupling between the magneto armature shaft 12 and the dynamo electric machine armature shaft operates to transmit in a proper driving direction, the rotary movement of said pump-shaft 14 and magneto armature shaft 12 to said dynamo electric machine armature shaft, whereby its armature is revolved to generate electrical energy or current which is used to charge storage batteries, and also to supply current direct to suitably disposed lighting units or lamps. The said clutch coupling when thus transmitting driving power to the dynamo electric machine armature shaft operates as follows:— The disk 27 being connected with the female-member 30 rotates the same; this rotary movement causes the inner surface 36 of said female-member 30 to roll the cylindrical rollers 37 into engagement with the walls 35 of the cut-away portions 34 of the male-member, and since said wall 35 tends to converge toward the inner surface 36 the said rollers 37 wedge themselves between the female-member and the male-member thus causing the rotary movement of the female-member to be transmitted to the male-member and consequently to the dynamo electric machine armature shaft, to which the latter is secured. Under such conditions the magneto-electric machine is driven in a fixed synchronous relation to the crank-shaft and to the movements of the internal combustion engine pistons, so that a proper delivery and generation of magneto ignition current is obtained. When the above operations are taking place, it will, of course, be understood that the sleeve 44 is shifted to such a position as to disconnect the spur-gear 50 from the gear-teeth 25 of the fly-wheel 24 of the engine crank-shaft, and to disconnect the gear teeth 59 from the spur-gear 60 of the dynamo electric machine armature shaft. When, however, the internal combustion engine is stopped or not running, and it is desired to crank the same to draw in and ignite the initial fuel charges in the engine cylinders to start the engine operating under its own power, the following operations take place. Electric energy previously stored in the storage batteries is supplied to the dynamo electric machine so that the same operates as a motor to convert electrical energy into mechanical power. The armature and armature-shaft of the dynamo electric machine now revolve, but since the engine crank-shaft is stationary it follows that the pump-shaft 14 and magneto armature shaft 12 are also stationary, but owing to the peculiar construction of said clutch-coupling said motor armature shaft is permitted to turn freely, notwithstanding the idleness of the said pump-shaft and magneto armature shaft. This independent rotation of the dynamo electric machine armature shaft is permitted because as it rotates it also rotates the male-member 33 of said clutch coupling, this has the effect of carrying the walls 35 of the cutaway portions 34 into contact with the rollers 37 tending to roll the same toward the diverging end of the space formed between the said wall 35 and the inner surface 36 of the female-member, and said space being slightly wider than the diameter of the roller, it follows that when thus operated the roller is prevented from wedging between said two surfaces and is maintained free from engagement with said inner surface 36 of the female-member so that the same may either remain stationary or travel at a slower rate of speed than the speed of the male-member.

The motor now operating to generate mechanical power it is necessary to shift the sleeve 44 to carry said spur-gear 50 into engagement with the gear teeth 25 of the flywheel 24, which is on the crank-shaft, and also to carry the gear teeth 59 of the female-member of the clutch coupling connected with said sleeve into mesh with the spur gear 60 on said armature shaft 5. When the gears are thus arranged the mechanical power of the motor is transmitted to the crank-shaft of the internal combustion engine so that the same is caused to rotate and consequently to reciprocate the pistons within the cylinders of the internal combustion engine thereby causing the same to draw into the cylinders the initial charges of fuel. As soon as the crank-shaft begins its revolutions as thus mechanically driven it follows that the pump-shaft 14 will also be rotated, and the magneto armature shaft in turn will be rotated. At first the speed will be slow, but will eventually attain such a rate as to properly generate and deliver the magneto ignition current, whereby the fuel charges in the cylinder are exploded and the engine begins to operate under its own power. If by any chance the engine is speeded up to such an extent that the rate of movement of the crank-shaft fly-wheel is faster than the rotation of the motor armature shaft 5 the clutch coupling located between the spur gear 60 and said armature shaft permits the said sleeve to turn ahead or faster so that no damage is done to the transmission mechanism between the motor and crank shaft, if the same is not promptly withdrawn. Of course, when the engine has started under its own power the said sleeve 44 may be shifted to disconnect the intermediate transmission gearing above mentioned, then the armature shaft 5 is mechanically driven, as previously described, and the dynamo electric machine is therefore operated as a generator of electrical energy which may be used to charge storage batteries, or to supply current for electric lights or any other desired purpose.

From the above detailed description of the apparatus involving the principles of my present invention and the operation of the same it will be apparent that I have provided a very compact and permanently associated electrical unit or mechanism whereby the three essential functions of ignition, starting and lighting for use in connection with auto vehicles and their internal combustion engines is essentially produced.

My invention presents a means for driving both the magneto electric machine and the dynamo electric machine while always maintaining a proper synchronous operation of the magneto, and at the same time permitting, when such condition is desired, the independent operation of the dynamo electric machine as a motor is easily and automatically secured without disconnecting its armature shaft from the driven association with the magneto armature shaft and pump shaft to the engine.

I am aware that some changes may be made in the arrangement and combinations of the parts, as well as in the details of the construction of the same without departing from the scope of this invention. Hence, I do not limit my invention to the exact arrangements and combinations of the parts as described in the foregoing specification, and as illustrated in the accompanying drawings, nor do I confine myself to the exact details of the construction of the said parts.

I claim:—

1. In electric starting mechanism for internal combustion engines, the combination with the crank-shaft of the engine of a fly-wheel provided with gear-teeth on its circumference, a dynamo electric machine, which also operates as a motor, provided with an armature shaft, a housing, a releasable transmission mechanism between said fly-wheel and said armature-shaft, comprising a spur-gear fixed on said armature shaft, a short shaft journaled in said housing, a sleeve rotatably mounted on said short shaft so as to be longitudinally movable thereon, means for moving said sleeve longitudinally, a spur-gear on said sleeve adapted to be carried into mesh with said gear-teeth of said fly-wheel, and an automatic clutch coupling provided with gear-teeth and mounted on said sleeve, said gear-teeth of said clutch coupling being adapted to be carried into mesh with said spur-gear on said armature-shaft.

2. In electric starting mechanism for internal combustion engines, the combination with the crank-shaft of the engine of a fly-wheel provided with gear-teeth on its circumference, a dynamo electric machine, which also operates as a motor, provided with an armature shaft, a housing, a releasable transmission mechanism between said fly-wheel and said armature-shaft, comprising a spur-gear fixed on said armature shaft, a short shaft journaled in said housing, a sleeve rotatably mounted on said short shaft so as to be longitudinally movable thereon, means for moving said sleeve longitudinally, a spur-gear on said sleeve adapted to be carried into mesh with said gear-teeth of said fly-wheel, and an automatic clutch coupling provided with gear-teeth and mounted on said sleeve, said gear-teeth of said clutch coupling being adapted to be carried into mesh with said spur-gear on said armature-shaft, said clutch-coupling comprising a male-member secured upon said sleeve, a female-member carrying said gear-teeth of said coupling and adapted to receive said male-member, and automatic means between said male and female-members whereby rotation of the latter drives the former, and yet permitting an independent forward rotation of said male-member and the sleeve to which it is secured.

In testimony, that I claim the invention set forth above I have hereunto set my hand this eighth day of May, 1913.

JOSHUA A. STRUTHERS.

Witnesses:
L. A. KNIFFIN,
GEORGE D. RICHARDS.